Jan. 27, 1931.　　　C. C. ARMSTRONG　　　1,790,083
ELECTRIC TOASTER
Filed April 27, 1929　　3 Sheets-Sheet 1
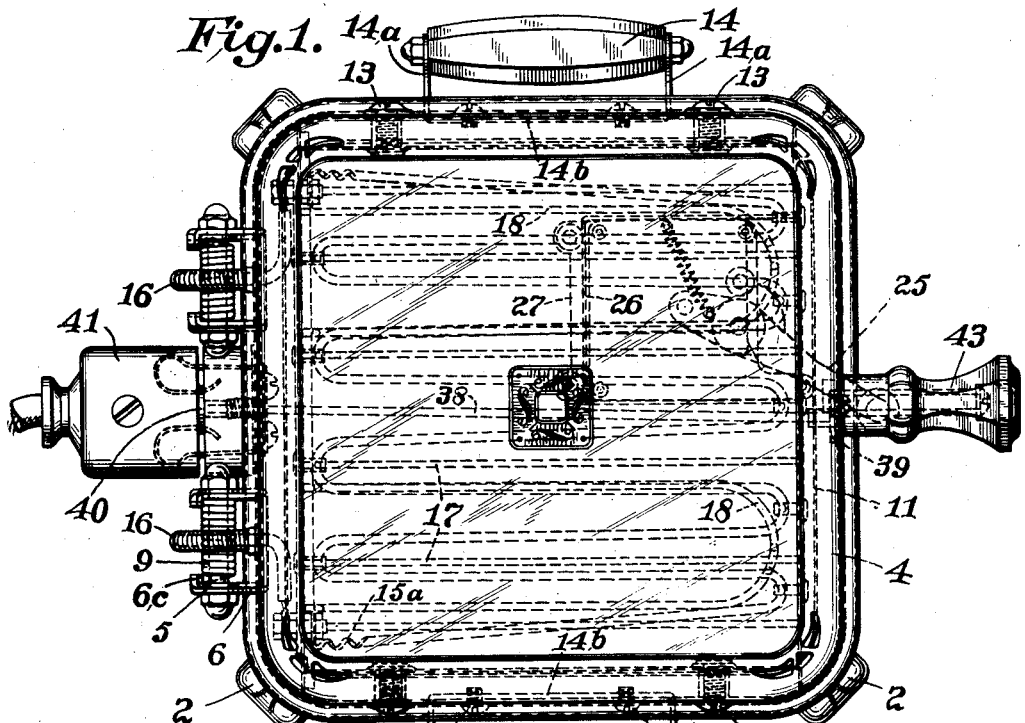
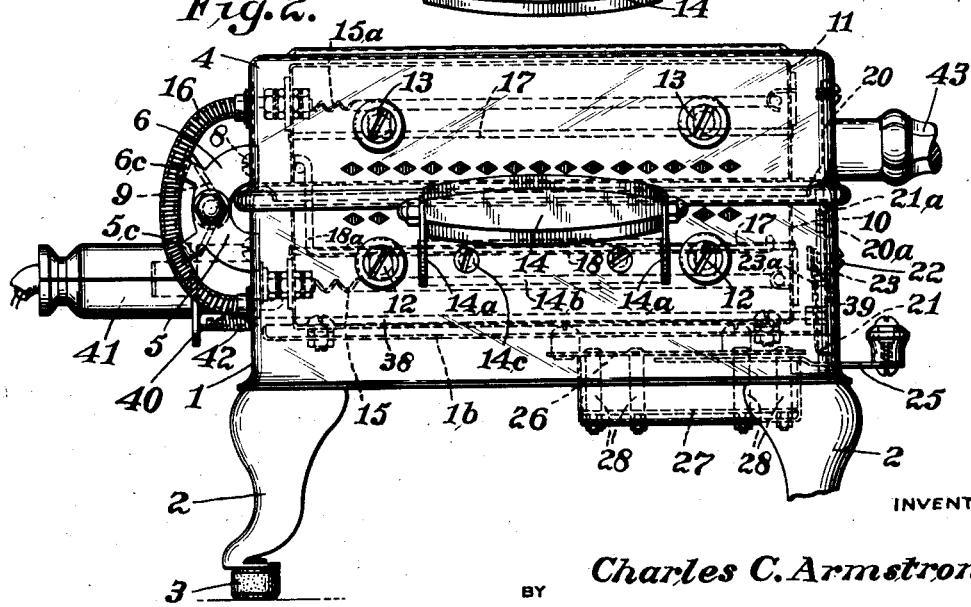
INVENTOR:
Charles C. Armstrong,
BY
ATTORNEYS Jan. 27, 1931.    C. C. ARMSTRONG    1,790,083
ELECTRIC TOASTER
Filed April 27, 1929    3 Sheets-Sheet 2

INVENTOR:
Charles C. Armstrong,
BY
Spear Middleton Donaldson & Hall
ATTORNEYS

Jan. 27, 1931.          C. C. ARMSTRONG          1,790,083
                          ELECTRIC TOASTER
                 Filed April 27, 1929    3 Sheets-Sheet 3
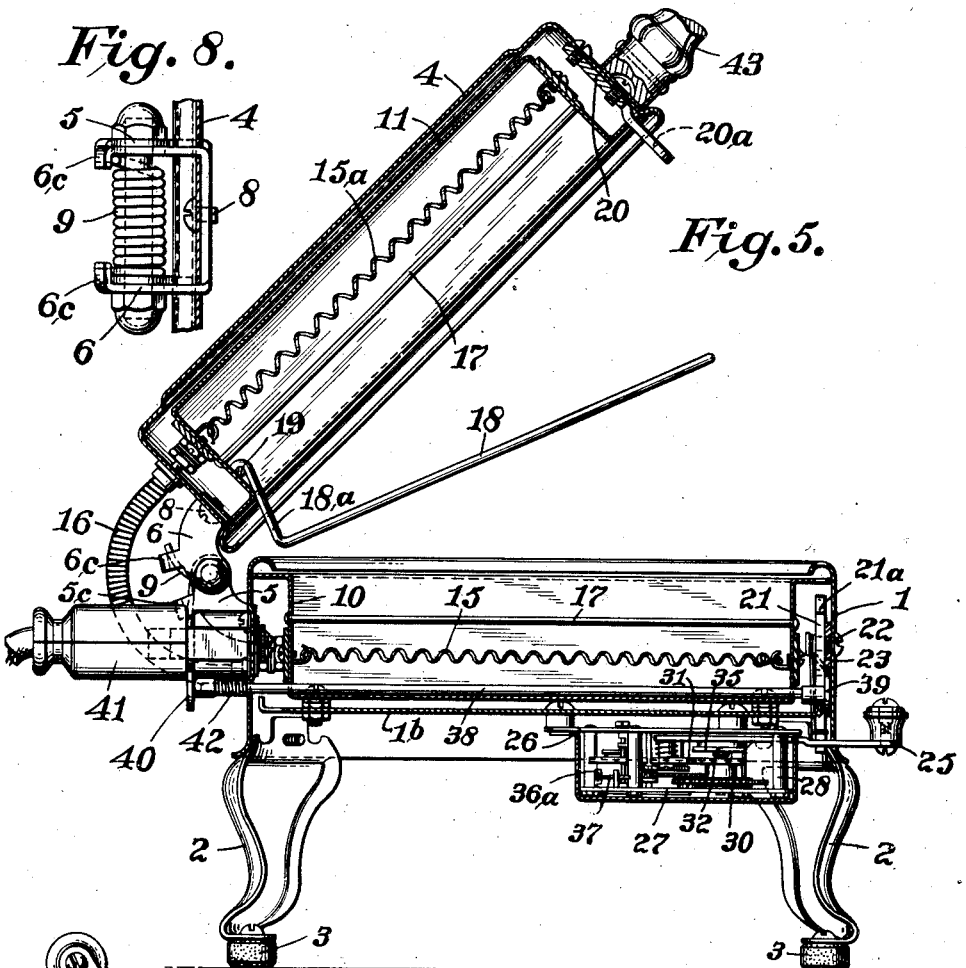
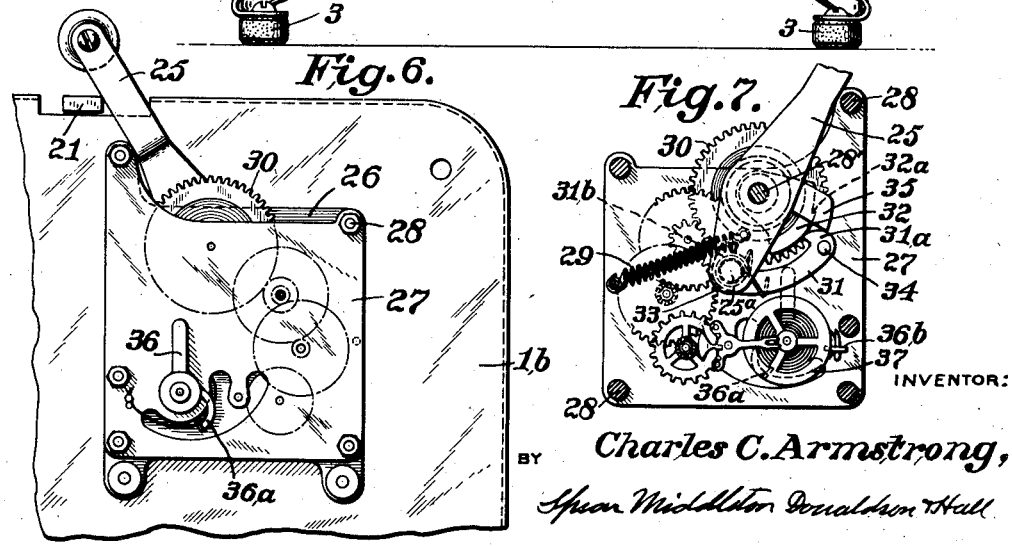
INVENTOR:
Charles C. Armstrong,
BY
ATTORNEYS Patented Jan. 27, 1931

1,790,083

UNITED STATES PATENT OFFICE

CHARLES C. ARMSTRONG, OF HUNTINGTON, WEST VIRGINIA, ASSIGNOR TO THE ARMSTRONG ELECTRIC AND MANUFACTURING CORPORATION, OF HUNTINGTON, WEST VIRGINIA, A CORPORATION OF DELAWARE

ELECTRIC TOASTER

Application filed April 27, 1929. Serial No. 358,656.

My invention relates to improvements in electric bread toasters of the automatic type; i. e., those wherein the apparatus is time-controlled and capable of being set so as to automatically discontinue the toasting after a predetermined interval.

The invention aims to provide an extremely efficient, economical and attractive form of toaster.

It further aims to provide a construction in which the bread may be readily placed in and removed from the toasting position, and the device easily manipulated.

Another object is to provide a construction whereby during toasting, the bread will be wholly enclosed, and after toasting is complete, the parts automatically opened and the bread positioned for convenient removal, and when so positioned will discontinue the toasting action, but will keep the toast warm if the operator does not wish to remove it or use it immediately.

The invention further aims to provide improved locking and releasing mechanism for the movable or cover part of the toaster.

With these and other objects in view, which will hereinafter appear, the invention includes the novel features of construction and arrangement and combination of parts hereinafter described, my said invention being defined by the claims appended hereto.

What I at present consider the preferred embodiment of the invention is illustrated in the accompanying drawing in which:

Figure 1 is a plan view of the toaster.

Fig. 2 is a side elevation.

Fig. 5 is a central vertical section showing the toaster in open position.

Fig. 6 is a bottom plan view of the portion of the toaster casing provided with the time control means.

Fig. 7 is a horizontal section through such time control means, looking downward or reverse to Fig. 6.

Fig. 8 is a detail of the spring hinge.

Figure 3:
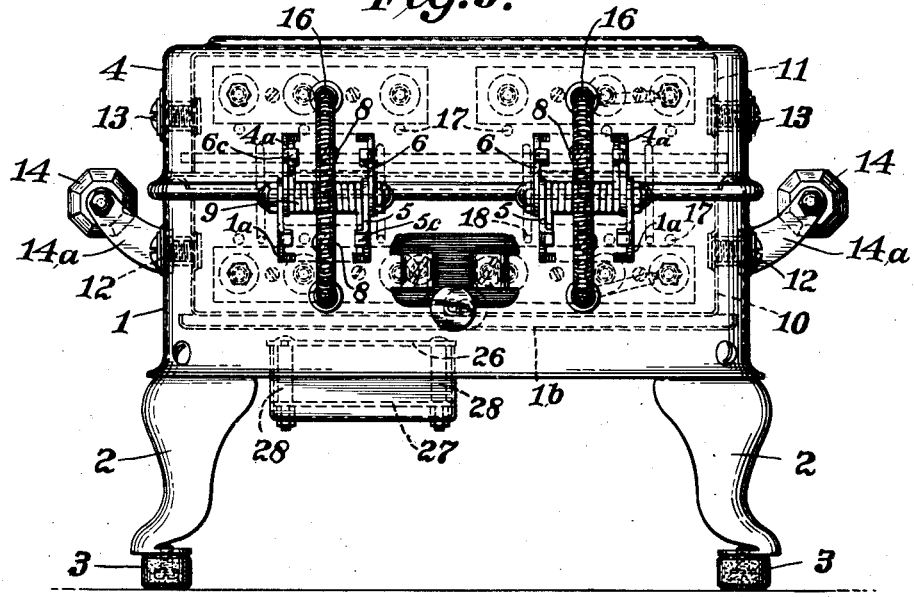
Fig. 3 is a rear elevation.

Referring by reference characters to this drawing, the toaster is shown as comprising a lower main section 1 provided with suitable supporting legs 2 terminating in feet or pads 3 of heat insulating material such as rubber which also serves to prevent scratching or otherwise damaging a table top on which the toaster may be used. 4 designates the upper closure member or section which is hinged to the main section by spring hinges and held closed by catch means hereinafter described and so arranged that, on release of the catch mechanism, the section 4 is automatically raised to open position, in which it preferably lies at approximately an angle of 45° for purposes which will hereinafter appear.

The two sections are formed of sheet metal and preferably have coacting edges which overlap when closed to form a tight joint.

In order to provide hinge means which will be economical of manufacture and assembly and which will serve both to automatically open the cover section and limit the opening movement thereof, I form L-shaped slots $1a$ and $4a$ (Fig. 3), in the back walls of said sections, the slots in the upper section being inverted relative to the slots in the lower section. Hinge members 5 and 6 are formed or stamped up from sheet metal each comprising an intermediate web and right angularly turned end flanges as clearly shown in Fig. 8. The one set of flanges are spaced apart a distance corresponding to that of the other flanges so that the said flanges may be overlapped to form the hinges, due to the relative lateral displacement of the upper and lower flanges as shown in Fig. 3, said flanges being provided with openings through which the hinge bolts or pintles are passed, which pintles are provided with suitable heads and nuts.

The end flanges are passed through the slots in the casing walls from the inside and the webs are secured to the inner faces of the walls by means such as screws or rivets 8.

The said end flanges of the hinges have angularly turned lugs $5c$ and $6c$, one set of such lugs engaging the respective ends of the helical springs 9 which surround the hinge pintles and hold the same under tension (or compression), whereby the springs tend constantly to open the cover section, the lugs forming also cooperating stops to limit the opening movement.

The two sections 1 and 4 are provided with lining sections 10 and 11 respectively having walls spaced from the walls of the sections 1 and 4 to form air chambers to reduce loss of heat through radiation, the lining sections being held in proper position by screws 12 and 13 respectively. The air chamber beneath the bottom of the lining section 10 is formed by bottom plate member 1b of pressed metal having marginal flanges and secured in place by means such as small bolts and nuts as shown. Handles 14 are provided for conveniently lifting the toaster as a whole, such handles being carried by arms 14a formed as integral right angular extensions of sheet metal plates 14b which are secured to the inner faces of the side walls of section 1 by screws 14c, the arms 14a projecting through slots in the said side walls.

The upper and lower sections are provided with heating elements of any approved type as indicated at 15 and 15a, the heating or resistance elements 15 of the lower section being connected with the outlet plug or coupling member and the resistance elements 15a of the upper section being connected in series with those of the lower sections by flexible exterior conductors housed in protecting resilient guards 16 preferably of spring wire.

The heating coils are preferably protected by guard wires 17.

The slice of bread to be toasted is supported by a tray or grid 18 which preferably comprises a pair of elongated wire loops having upwardly extending or angularly turned ends 18a secured to a cross rod 19 having its ends pivotally supported in openings in the side lining walls of the upper section in such position that when the upper member 4 of the toaster is opened, the angularly turned ends 18a of the wires will contact with the abutment or shoulder formed by the lower edge of the end wall of the lining member, and cause the tray or grid to be raised to the inclined position shown in Fig. 5, in which position it will be spaced apart equally from both heating elements. In such position, it will be too far from the said elements for the bread to be toasted, which may be left on the tray temporarily, and while so held will be kept warm.

When the upper section is closed, the tray or grid will be in horizontal position and the toast subject to heat on both sides from the upper and lower heating elements.

For holding the upper section closed and for releasing it and allowing it to open at the completion of the toasting operation, I provide the following mechanism.

Figure 4:
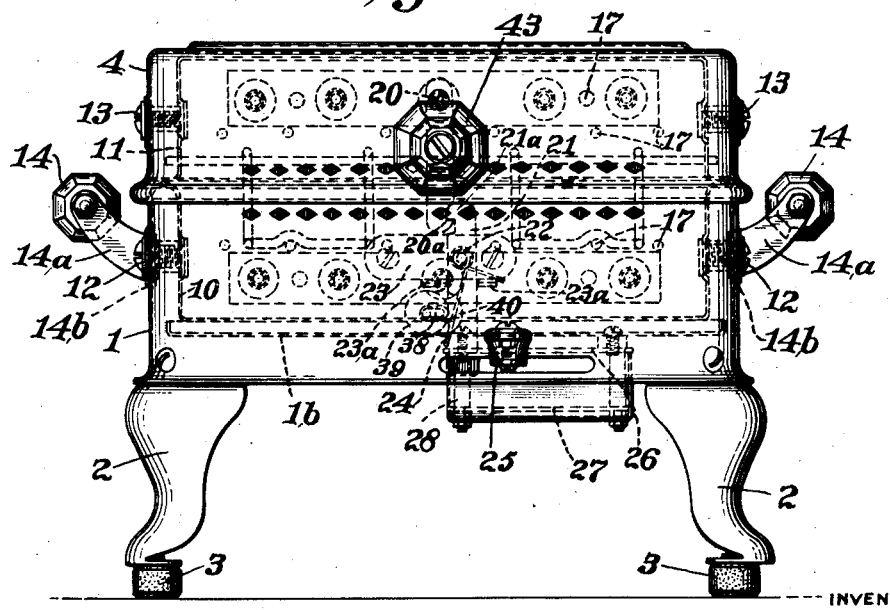
Fig. 4 is a front elevation.

The upper section 4 carries a fixed catch or "strike" comprising a bar 20, Figs. 4 and 5, suitably secured as by means of screws or rivets to the inner face of the front wall and having its lower end offset and provided with a lateral projection or lug 20a designed to be engaged by a coacting lug 21a on a lever 21 fulcrumed at 22 on the inner face of the front wall of the lower section 1. As a convenient manner of mounting the lever, I provide a plate member 23 which carries the pivot pin 22 fast thereon, such plate being secured to the inner face of the wall of section 1 by means such as screws, and having out turned lugs 23a lying on opposite sides of the lever and serving to limit the movement thereof in opposite directions.

By this arrangement, the catch lever is held spaced from the carrying wall for a purpose which will hereinafter appear. A spring 24 has an eye portion carried by a projecting portion of the pivot pin and one arm bearing against one of said lugs while its other arm presses against the portion of the lever below the pivot and tends to keep its other end yieldingly pressed into locking position. The lower end of the lever 21 projects through a slot in the plate 1a into the path of a spring pressed striker arm 25, which is designed to normally bear against said lower end of lever 21 with sufficient force to hold it in unlatching position so that the toaster will remain open. This lever 25 projects into convenient position at the front of the toaster for manipulation by the hand of the operator and when swung back away from the catch lever, allows the latter to move into locking position.

Time controlled means is provided for holding the lever in retractd position for a predetermined period of time and then releasing it, allowing it to actuate the catch lever to release the catch and open the top closure section.

This mechanism comprises an ordinary clock train (Figs. 6 and 7), carried by a frame comprising spaced parallel plates 26, 27 connected by corner posts as is customary and secured to the under side of the bottom closure plate 1a by means of screw bolts.

The clock train comprises a main gear 30 and customary escapement mechanism with the usual intermediate gearing. Lever 25 is fulcrumed to articulate freely about a fixed post 28 carried by plate 26 and said lever is connected by tension spring 29 to a fixed point on plate 26, said spring tending to move said lever into latch releasing position.

The inner end of lever 25 carries a post 25a on which is articulated a pawl 31 having a tooth 31a at its free end designed to engage with a shoulder 32a formed on the peripheral edge of an arc shaped plate 32 which is mounted for rotation with frictional engagement with the hub of gear 30, said hub and gear being carried by a shaft having one end journaled in plate 27 and the other in the end of post 28.

A spring 33 coiled around post 25a tends to press the pawl 31 into contact with the edge of said arc shaped plate. The free end of the pawl carries a pin or stud 34 positioned to coact with the inclined or cam shaped end of an arm 35 fast on the stud 28.

The pawl or dog 31 has adjacent its pivoted end a tooth or projection (see Fig. 7) which is positioned to engage the radial edge of arc shaped plate 32.

When the lever 25 is moved in an anti-clockwise direction (see Fig. 7), the pawl 31 is moved with it and the dog or projection is first carried into engaging position relative to the shoulder 32a, whereupon the rear dog or tooth 31b contacts with the rear radial edge of plate 32 and moves this around against the frictional resistance of the gear hub. This movement carries the stud or pin 34 beyond the cam or inclined end of arm 35 so that the pawl will be locked to the arc-shaped plate when the operator releases the lever 25. Thereupon, the pull of the spring 29 tends to move the lever back to initial position carrying with it the said arc shaped plate 32 which, through its frictional engagement with the hub, rotates the latter and its connected gear and drives the clock train. This movement continues until the pin or post 34 rides up on the inclined end of arm 35 whereupon the pawl is disengaged from the shoulder 32a and the lever 25 snaps back into contact with the latch lever and actuates the latter to unlatch the top section, the impact of this movement ensuring the unlatching operation.

To vary the time of unlatching, I provide a regulating lever 36 articulated on plate 27 and having a slotted arm 36a working through an arc shaped opening in plate 27 and engaging the outer coil of the hair spring 37 of the escapement mechanism.

With the construction above described, the top or cover section would always remain open while the toaster is not in use.

To enable it to be held closed at such times and when the electric supply cable is disconnected, I provide the following mechanism.

A rod 38 slidably guided in openings in the casing walls has at its front end a disk or button 39 designed to coact with the latch lever 21 and at its rear end which projects through the outside wall of the casing, a similar disk or button 40 designed to coact with the front face of the socket member 41 of the coupling or electric connection.

A spring 42 coiled around the rod between the button 40 and the casing wall tends to move the button 40 away from the casing. When the coupling socket member is in place, the button 40 and rod are held pushed in against the pressure of the spring at which time the button or disk 39 is also pushed in out of the path of the latch lever so that the latter is free to function under the action of the time controlled means as hereinbefore described. When the socket member is removed, the spring tends to move the rod and buttons back and hence, when the top section is closed, the button or disk 39 will be moved into position to engage the lever 21 below its pivot and will prevent the pressure of the lever or arm 25 from unlatching it.

The closure section is preferably provided with a handle 43 for convenience in closing the same.

Having thus described my invention, what I claim is:

1. A bread toaster comprising a lower casing section, an upper movable casing section hinged thereto, heating means carried by said sections, a bread rack having an upstanding portion hinged to the movable section adjacent the hinged side thereof, and abutment means carried by said movable section for contact with said upstanding part to tilt the bread rack when the movable section is opened.

2. A bread toaster comprising a lower casing section, an upper casing section hinged thereto and having a ledge adjacent the hinge, heating means within said sections, and a bread rack having an upstanding portion hinged to said upper section on an axis above the line of said ledge.

3. A bread toaster comprising a lower casing section, an upper casing section hinged thereto, heating means within said sections, a ledge carried by said upper section adjacent the hinge, a cross rod rotatably carried by said upper section above the line of said ledge, and wire bread supporting means having upturned portions at one side rigidly connected to said cross rod.

4. A bread toaster comprising a pair of hinged casing sections, electric heating means carried by both of said sections and having a single outlet plug connection, a conductor having a coupling member cooperating with said connection, spring means tending to open said sections, means for supporting bread between said sections, catch means for holding said sections closed, time controlled means for releasing said catch means, and means controlled by the application of the coupling member for preventing the time controlled means from operating the catch means.

5. A bread toaster comprising a lower section, an upper section hinged thereto, electric heating means for said sections, means for supporting bread between said sections, spring means tending to open the upper section, a fixed catch member carried by the upper section, a catch lever fulcrumed on the lower section and spring pressed to normally engage said fixed catch, time controlled means for moving said catch lever into releasing position to permit the upper section to open, a movable abutment member for engaging said catch lever to prevent movement thereof to unlatching position, and a spring pressed slidable rod carried by the lower section and connected with said abutment, said rod having an end contact part positioned for engagement with the cable coupling element.

In testimony whereof I affix my signature.

CHARLES C. ARMSTRONG.